July 11, 1961 S. M. MacNEILLE 2,991,693
FRONT PROJECTION SCREEN
Filed July 23, 1956 2 Sheets-Sheet 2

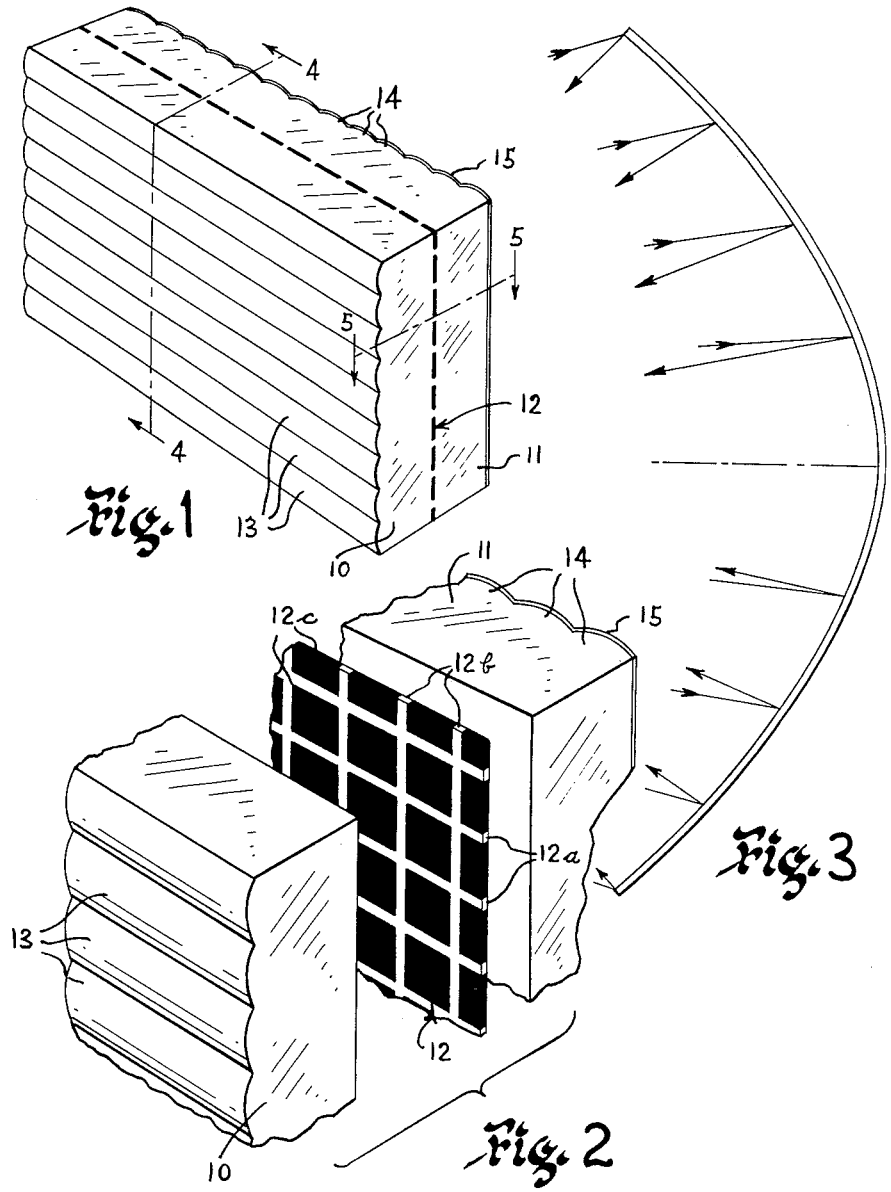

INVENTOR
STEPHEN M. MacNEILLE
BY Louis L. Gagnon
Noble S. Williams
ATTORNEYS

United States Patent Office 2,991,693
Patented July 11, 1961

2,991,693
FRONT PROJECTION SCREEN
Stephen M. MacNeille, Thompson, Conn., assignor to American Optical Company, Southbridge, Mass., a voluntary association of Massachusetts
Filed July 23, 1956, Ser. No. 599,494
9 Claims. (Cl. 88—28.9)

This invention relates to optical projection viewing screens and the like, and more particularly to improvements in such viewing screens of the reflecting or front projection type and method of making same.

Heretofore, conventional viewing screens of the reflecting or front projection type, when employed with ordinary theatre projection systems, have been restricted in their use to very materially darkened, or at least to relatively dimly lighted, areas since otherwise only images of low or insufficient contrast would be provided. One reason for such lack of contrast can be charged directly to the fact that most viewing screens of this type diffuse the light incident thereon whether same is being received from the associated projector or from extraneous sources, with the result that the light from outside sources tends to dilute the contrast and reduce the value of the projected image.

Furthermore in such earlier screens, since the diffused light being reflected from all points on the screen tends to spread in all directions, a relatively large percentage of this light is wasted for its does not reach the audience area, thus inefficient use of the light forming the image results and less image contrast is produced.

Larger and larger viewing screens are being used at the present time in an endeavor to widen out the field of action being presented by the motion pictures and in order to produce a depth effect in the minds of the audience observing such action upon the viewing screen some of these screens have been horizontally concavely curved. While such have given desirable results, viewing screens of this type employing diffusing reflecting surfaces have not provided as good image contrast as might be hoped for since image forming light striking one part of the concavely curved screen tends to spread to other areas of the screen with the result that what may be termed "reillumination" occurs; and this reillumination, as might be expected, tends to deteriorate the contrast in the image being formed. While the present invention is very useful and desirable when incorporated in a "flat" front projection viewing screen, since the deleterious effect of extraneous light is removed, the invention may also be advantageously incorporated into a horizontally concavely curved viewing screen to additionally preclude such reillumination from light from other parts of the viewing screen. Additionally, the invention, whether applied to "flat" or "concavely curved" viewing screens, may be so controlled as to its directional effect as to direct substantially all of the projected light impinging thereon substantially uniformly back toward all parts of a selected audience area and while also confining this light within a predetermined viewing angle, considered from any point on the front surface of the screen and measured both horizontally and vertically.

In order to provide a projection system which would present a clearly discernible projected image to an observer without the need of room darkening or the like, it is, therefore, of primary importance to increase the intensity of the image forming light directed to said observers from the projection screen so as to provide sufficient contrast between said projected image and the existing lighting conditions.

Since it has been found to be impractical to increase the intensity of the light emitted by the projector due to the danger of overheating which would cause possible damage to said projector and the photographic film used therein, it can be seen that by providing a viewing screen which would be adapted to substantially exclude the transmission and reflection of stray light and cause the image forming light rays emitted by the projector to be controllably directed towards the observers, sufficient contrast between the projected image and the existing lighting conditions would be obtained and a clearly discernible image would, therefore, be received by said observers without the need for room darkening or otherwise preventing stray light from reaching said viewing screen.

Various means and methods of partially absorbing or shielding stray light from reflection by projection screens while using lenticulated or otherwise shaped light directing surfaces upon said viewing screens have been known heretofore particularly in the construction of transmissive or rear surface projection type screens. However, the construction of front projection or reflective type screens by the prior art methods have been known to be relatively complicated and expensive while only partially eliminating extraneous light incident from sources other than the desired image producing means, thereby failing to eliminate the above-mentioned diluted or washed out effect of the projected image which, in turn, reduces the desired contrast and consequently the final brightness of the projected image received by the observers.

It is, therefore, a principal object of this invention to provide an inexpensive, simple, yet highly efficient, reflection-type front projection viewing screen and method of making same which is adapted to be used in conjunction with conventional optical projectors to provide observers thereof with clearly descernible projected images which are reflected from said screen while subsequently eliminating the need for room darkening, shielding or otherwise preventing extraneous light from reaching said screen.

Another object is to provide a novel viewing screen of the above character which reflects light incident from a relatively small source and distributes it throughout a relatively large and specified solid angle but which, at the same time, does not reflect light incident from regions other than that of said source.

A further object is to provide a front projection screen and method of making same having a main body or supporting member formed of transparent material and provided with a series of cylindrical lenticular lens portions extending in a horizontal direction upon the front surface thereof and a second series of similar cylindrically shaped rear portions extending in a vertical direction upon the rear surface, said rear portions being coated or otherwise provided with a highly reflecting material to provide rear reflecting portions, said front lens portions and rear reflecting portions being positioned and designed so as to have the focal planes thereof coincide, said common focal plane being rendered opaque and non-reflecting except for transparent narrow bands extending both horizontally and vertically, said transparent horizontal bands being positioned to coincide with the images of the lens portions of the front surface of said screen and the transparent vertical bands positioned to coincide with the reflected images of the rear surface reflecting portions.

Another object is to provide a projection screen of the above character which, when formed to the shape of conventional curved screens, will substantially reduce the diluted or washed out effect of cross illumination which has been present heretofore in front projection screens of said curved type.

Another object is to provide a viewing screen of the above described type wherein the elongated cylindrical lens portions thereof provide a definitely calculated geometrical pattern which can be described in mathematical or geometrical terms thereby providing a simple and efficient means for obtaining separately controlled degrees of light spread in either or both of the two meridians by variation of the values for the width and/or focal length thereof.

It is a further object to provide a front projection screen of the character described wherein the shaped screen elements upon the surfaces of the projection screen may be formed to a size which would render them substantially invisible at normal viewing distances therefrom while still maintaining the above-described predetermined optical properties.

Another object of the invention is to provide a viewing screen of the above character which lends itself to straightforward fabrication by simple and known techniques.

Other objects and advantages of the invention will become apparent from the following description taken in connection with the accompanying drawings, and it will be apparent that simple, efficient and economical means and method have been provided for accomplishing all the objects and advantages of the invention. However, it will be understood that various omissions, substitutions and changes in the form and details of the embodiment illustrated may be made by those skilled in the art and that all matter herein is to be interpreted as illustrative and not in a limiting sense.

Referring to the drawings,

FIG. 1 is a front perspective view of the viewing screen embodying the invention;

FIG. 2 is an enlarged, exploded front perspective view of a portion of the viewing screen embodying the invention;

FIG. 3 is a diagrammatic top plan view of a curved screen embodying the invention;

Figure 4:
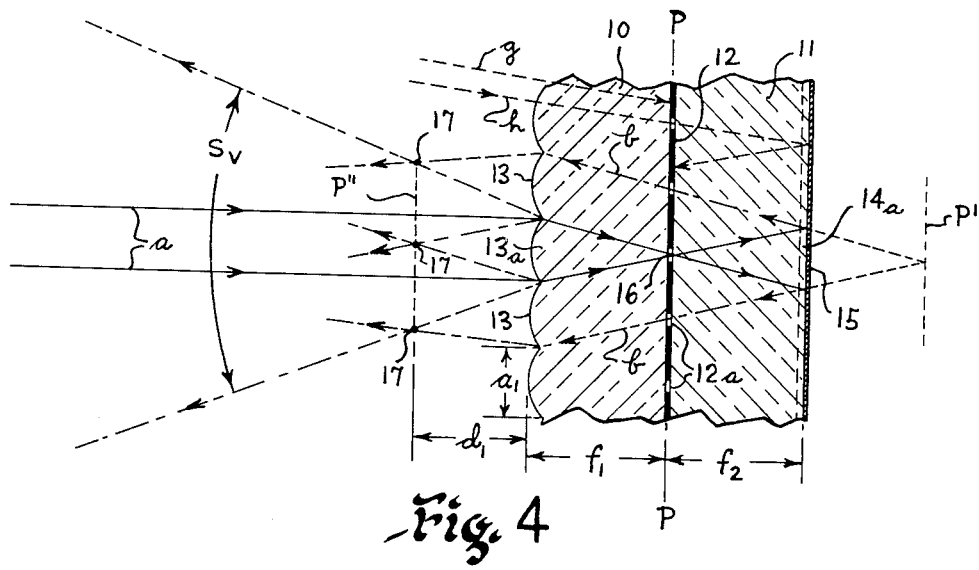
FIG. 4 is a vertical cross-sectional view taken at a position substantially as illustrated by line 4—4 of FIG. 1 and diagrammatically illustrating the function of the viewing screen in the vertical meridian.

Referring more particularly to the drawings wherein like characters of reference designate like parts throughout the several views, it will be seen that the main body or supporting member of the viewing screen embodying the invention comprises broadly a laminated or otherwise assembled pair of sheetlike light transmitting front and rear supporting portions 10 and 11, respectively, having an opaque and non-reflecting light barrier 12, which is provided with both horizontal and vertical narrow light transmitting bands or slits 12a and 12b, interposed therein.

The said front supporting portion 10 is further provided with a series of contiguously related cylindrical lenticules 13 extending in a horizontal direction thereacross and having their focal planes optically established at the central plane of the above-mentioned light barrier 12 whereupon the rear supporting portion 11 is likewise provided with a similar series of contiguously related cylindrical lenticules 14 which extend vertically or in a direction normal to that of the above-mentioned lenticules 13. The lenticules 14, however, are provided upon the outer surfaces thereof with a coating 15 of a highly reflecting material such as, for example, aluminum, silver, or the like to cause light entering said lenticules 14 to be reflected thereby and refocused upon the focal plane of said lenticules 14 which is coincident with the above-mentioned focal plane of lenticules 13.

The light barrier 12 is preferably constructed of a photosensitive material or the like which, when exposed to light will, in the exposed areas, be rendered transparent to form the horizontal and vertical transparent bands 12a and 12b and in the unexposed areas 12c rendered opaque and non-reflecting. When assembled in the manner illustrated in FIGS. 1, 2 and 4, said light barrier 12 is positioned relative to the lenticules 13 and 14 so as to have the horizontal transparent bands 12a coincide with the images of the projection lens formed by the front lenticules 13, while the vertical transparent bands 12b coincide with the images of the projection lens formed by the rear lenticules 14 thereby causing image forming light rays entering the supporting portion 10 to be refracted by lenticules 13 and imaged at the horizontally extending transparent bands 12a and pass through the supporting portion 11 to be reflected by coating 15 and reimaged along the vertically extending transparent bands 12b. The said light rays would then continue outwardly through supporting member 10 and be received by observers positioned between the projection screen and an optical projector or the like used to transmit the image forming light rays to said screen.

In order to more fully understand the purpose and function of the above described components comprising the viewing screen, it is to be pointed out at this time that in order to construct a front surface or reflective type of viewing screen for use in daylight or brightly lighted areas, it is essential that said screen transmit to a viewing audience the maximum amount of light that is received from the projector while at the same time excluding the transmission of light which is incident from sources other than the projector.

Figure 5:
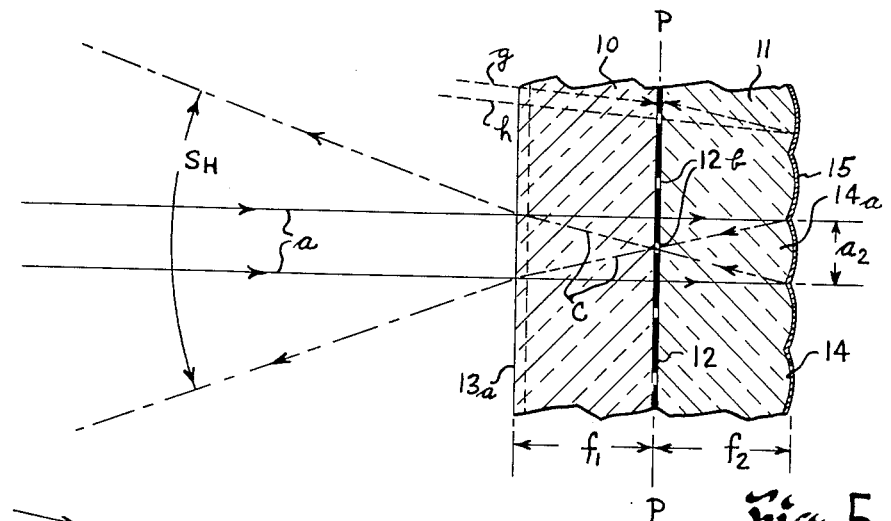
FIG. 5 is a horizontal cross-sectional view taken at a position substantially as illustrated by line 5—5 of FIG. 1 and diagrammatically illustrating the function of the viewing screen in the horizontal meridian.

The viewing screen embodying the invention is designed to accomplish the above results in the following manner:

Referring to FIGS. 4 and 5 wherein said figures are drawn without regard to scale or proportion in order to provide a clear diagrammatic illustration of the function of the device embodying the invention, a trace of a beam of light, having its outer boundaries represented by solid lines $a$ and being sufficient only to illuminate one of the lenticules 13, is illustrated for purposes of further clarity.

Referring more particularly to FIG. 4 which illustrates said trace of light in the vertical meridian only, it can be seen that a primary image 16 of the lenticule 13a is formed in plane P so as to allow the light to pass through one of the horizontal transparent bands of light barrier 12 and be reflected by the coating 15 provided upon rear lenticule 14a.

After reflection from lenticule 14a, a vertual image is formed in plane P' whereupon following emergence of the light through the front surface of the viewing screen as shown by dot-dash lines $b$, a series of real images 17 is formed in plane P'' at a distance $d_1$ from said front surface.

It can be seen from FIG. 4 that light entering one lenticule 13a, as shown, may emerge through several lenticules so that the total vertical spread illustrated is the result of the spreads of rays from a single virtual image emerging through adjacent lenticules and forming a number of real images 17.

It can then be seen that the angular spread from any one of the images 17 in plane P'' is simply $$\frac{a_1}{d_1}$$

Therefore, by first order geometrical optics, $$d_1 = \frac{f_1}{n}\left(1 + \frac{f_1}{2f_2}\right)$$

wherein $f_1$ and $f_2$ are the focal length of the front and rear lenticules respectively and $n$ is the index of refraction of the material of the supporting portions 10 and 11.

The angular spread $$\frac{a_1}{d_1}$$

would then equal $$\frac{a_1 n}{f_1(1+f_1/2f_2)}$$

Furthermore, in plane P" the $k$th image down from the one directly in front of the lenticule on which the light is incident will have its principal ray sloping downward at an angle $$\frac{k\, a_1\, n}{f_1+2f_2}$$

It is to be pointed out that $k$ cannot exceed $$\frac{f_2}{f_1}$$

and that $k_{max}$ is the next larger integer above the value $$\frac{f_2}{f_1}$$

so that the extreme rays from the most remote of the images 17 will have a spread of $S_v$ where $$S_v = \frac{2k_{max}a_1 n}{f_1+2f_2} + \frac{a_1 n}{f_1\left(1+\frac{f_1}{2f_2}\right)} = \frac{4na_1f_2}{f_1(f_1+2f_2)}$$

Referring more particularly to FIG. 5 which illustrates a trace of the above described light in the horizontal meridian and more clearly illustrates the function of the rear lenticules 14, it can be seen that the reflected light indicated by dot-dash lines $c$ is reimaged at plane P so as to pass through the vertically extending transparent bands or slits 12b of light barrier 12 and be projected outwardly through the front surface of the viewing screen.

The spread $S_H$ produced by the rear lenticules 14 is to the first order approximation equal to $$n\frac{a_2}{f_2}$$

From the above formulas and description of the vertical and horizontal spread, it can be seen that suitable values of both said vertical and horizontal spread may be obtained with reasonable values of the focal lengths $f_1$ and $f_2$ of the lenticules 13 and 14 in combination with suitable values of the widths $a_1$ and $a_2$ of said lenticules. However, it is to be pointed out that the horizontal and vertical transparent bands 12a and 12b of the light barrier 12 must be located at the focal plane of the lenticules 13 and 14, that is, the focal planes of said lenticules 13 and 14 must be coincident at the plane P of the light barrier 12.

By so controlling the vertical and horizontal spread of light, it is possible to direct substantially all of the light received from a projector into a specified viewing area such as in instances where a single level audience might require, for example, a horizontal spread of 30° with a vertical spread of only 15° to prevent unused light from being projected over the heads of the viewers. However, in instances where an audience comprises several levels, it may be necessary, for example, to have a 30° spread of light in both the horizontal and vertical meridians.

In combination with the above means for directionally controlling the light transmitted to a viewing area, the invention further increases the discernability of the images reflected therefrom by excluding the reflection of light incident from regions other than that of the source by means of the light barrier 12.

From FIGS. 4 and 5, it can be seen that extraneous light, diagrammatically illustrated by dotted lines $g$ and $h$, upon entering the viewing screen embodying the invention would be absorbed by the opaque and non-reflecting areas 12c of the barrier 12 and consequently prevented from combining with and diluting the image-forming light rays from the projector.

If extraneous light rays such as represented by line $g$ were to enter the front-supporting portion 10 of the viewing screen, it can be seen that said light rays would be immediately absorbed by the front surface of the opaque and non-reflecting portions 12c of the barrier 12. However, if light rays such as shown by line $h$ were to enter the viewing screen from such an angle as to allow said light rays to pass through either the horizontal or vertical transparent bands 12a and 12b of the barrier 12 it can be seen from FIGS. 4 and 5 that said light rays would be reflected by the outer surface of lenticules 14 so as to strike the rear surface of the opaque and non-reflecting portions 12c of said barrier and also be prevented from being transmitted to the audience viewing area.

It is, therefore, conclusive that by controllably directing the image-forming light rays to an audience area and simultaneously rejecting the projection of stray light to said audience area by the above described means that a sharp, clearly defined picture image may be obtained without the need of a room darkening or otherwise preventing stray light from reaching the viewing screen.

In the use of conventional curved projection screens, it has been found that a deterioration of the images projected thereon is caused partially by cross illumination or reflection of light from one portion of the screen to another but by the use of a viewing screen of the type illustrated and described herein said deterioration would be eliminated since light which is incident from sources other than the projector will not be reflected by said viewing screen but will be absorbed by the opaque non-reflecting portions 12c of the light barrier 12 in the manner previously described.

Figure 6:
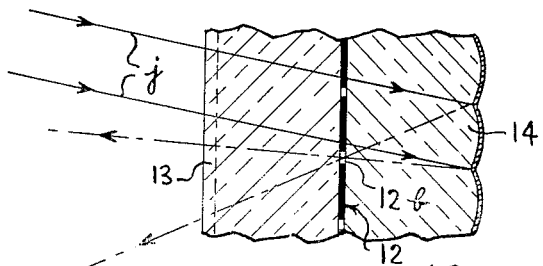
FIG. 6 is a diagrammatic cross-sectional view of an alternative form of the invention.

It is to be pointed out, however, that although the construction of a curved screen would be generally similar to that of a flat screen, that is, the light barrier 12, would be located at the coincident focal plane of the front and rear lenticules, the vertical transparent bands of said light barrier would be displaced from the center of curvature of the rear lenticules an amount sufficient to allow the reflected images from said rear lenticules to be formed at said transparent bands 12b as shown in FIG. 6 wherein the image-forming rays from an optical projector would enter the screen at an angle which angle would be progressively increased from the center of the screen to the outer edges thereof.

FIG. 6 illustrates a horizontal sectional view of a portion of a curved type screen taken adjacent one side edge thereof and diagrammatically illustrates image-forming light rays $j$ angularly entering said portion of the screen and being reflected forwardly by a rear lenticule 14 to be imaged at a vertical transparent band 12b which is displaced an amount sufficient to receive said image and permit said reflected light rays to pass outwardly to an audience area, the angle of spread being calculated in the manner described previously for FIGS. 4 and 5.

It can thus be seen that by properly locating the transparent bands 12a and 12b of the light barrier 12 relative to the lenticules 13 and 14 that many different desired shapes of viewing screen may be provided such as for example, a flat screen, a screen curved in one meridian and flat in the other, a diagrammatic top plan view of which is shown in FIG. 3, a parabolic screen, or a spherically shaped screen.

If it is desirable or necessary to add diffusion in order, for instance, to prevent sharp cut-offs or scintillation, it can be provided by horizontal rulings or grooves in the horizontal transparent bands 12a and vertical rulings or grooves in the vertical transparent bands 12b of the light barrier 12. On so designing these rulings to diffuse the light only in a plane perpendicular to the direction of the band, the focussing properties will not be upset and all the light will still be incident at said transparent bands. Band 12b could be ruled both vertically and horizontally.

It is to be pointed out that the cylindrical lenticules 13 and 14 of the viewing screen would preferably be constructed of a size which would render them substantially invisible at normal viewing distances to eliminate distracting or otherwise objectionable configurations from appearing in combination with the image being viewed by said screen.

Said cylindrical lenticules 13 and 14 here used not only provide a simple and efficient means for obtaining separately controlled degrees of light spread in the two meridians but also lend themselves to straightforward fabrication by known techniques such as, for example, embossing, moulding, or the like.

Embossing rollers to produce the lenticules, for instance, can be cut directly on a lathe or the like and if a so-called "echelon" effect is required, this can be inserted continuously by a continuous adjustment of the cutting tool. In this way, designs may be produced by taking into account the fact that the light from the projector is incident at different angles in different parts of the screen.

In order to obtain proper registration between the transparent bands 12a and 12b in the common focal plane and the corresponding lenticules 13 and 14, it is desirable that said transparent bands be made by photographic or photo etching methods.

An example of one of said methods for fabricating of a viewing screen of the above character would employ two transparent sheets of plastic, glass or the like, each being suitably provided with cylindrical lenticules on one side and a photosensitive material positioned upon each of the opposite sides thereof.

The two lenticulated sheets would then be assembled with the cylindrical lenticules perpendicular to each other and the two photosensitive surfaces contiguous, whereupon the assembly would be exposed to light from a source in a position geometrically corresponding to the position that the projector ultimately will occupy. After exposure, the lenticulated sheets would then be separated and processed to develop the photosensitive material on each whereby the exposed areas or slits will be transparent while the unexposed areas will be opaque. Obviously, the transparent areas or slits on each sheet will thereby be retained in proper registry with the related lenticules of said sheets. The sheets 10 and 11 are then reassembled with the slits in the same registration in which they were originally formed.

From the foregoing description it will be seen that simple, efficient and economical means and method have been provided for accomplishing all of the objects and advantages of the invention.

Having described my invention I claim:

1. A front projection viewing screen for displaying optical images projected thereon by an optical projector comprising a light transmitting member having a series of contiguously related parallel cylindrical optical elements horizontally extending across the front surface thereof and a second series of contiguously related parallel cylindrical optical elements extending vertically upon the rear surface of said light transmitting member, said rear surface of the light transmitting member being provided with a light reflecting means and the focal plane of each of said cylindrical optical elements comprising said first and second series forming a concurrent focal plane, light absorbent means interposed between said front and rear surfaces of said light transmitting member at said concurrent focal plane, said light absorbent means having a plurality of parallel horizontally extending light transmissive areas corresponding to said horizontally extending optical elements for transmitting image forming light received and transmitted by said horizontally extending optical elements, and said light absorbent means further having a plurality of parallel vertically extending light transmissive areas corresponding to said vertically extending optical elements for receiving and transmitting the image forming light received and reflected by the vertically extending optical elements, whereby substantially only that light which is incident upon said screen from a predetermined projection point will be reflected by said screen and controllably directed forwardly from said viewing screen.

2. A front projection viewing screen for displaying optical images projected thereon by an optical projector comprising a light transmitting member having a series of contiguously related parallel cylindrical optical elements horizontally extending across the front surface thereof and a second series of contiguously related parallel cylindrical optical elements extending vertically upon the rear surface of said light transmitting member, said rear surface of the light transmitting member being provided with a light reflecting means and the focal plane of each of said cylindrical optical elements comprising said first and second series forming a concurrent focal plane, light absorbent means interposed between said front and rear surfaces of said light transmitting member at said concurrent focal plane, said light absorbent means having a plurality of parallel horizontally extending light diffusing transmitting areas corresponding to said horizontally extending optical elements for diffusing and transmitting image forming light received and transmitted by said horizontally extending optical elements, and said light absorbent means further having a plurality of parallel vertically extending light diffusing transmitting areas corresponding to said vertically extending optical elements for receiving and transmitting the image forming light received and reflected by the vertically extending optical elements, whereby substantially only that light which is incident upon said screen from a predetermined projection point will be reflected by said screen and controllably directed forwardly from said viewing screen.

3. A front projection screen comprising a supporting member of appreciable width and height and formed of light-transmitting material, said member having a first series and a second series of elongated cylindrically curved substantially parallel contiguously related optical elements formed respectively upon the front and rear surfaces of said member, one of said series of cylindrically curved optical elements extending in a direction substantially at right angles to the other of said series of cylindrically curved optical elements, a light-reflecting layer disposed upon the outer surfaces of all of the cylindrically curved optical elements at the rear of said member, and a light-shielding layer so interposed between and in generally parallel relation to the front and rear surfaces of said member as to be substantially at a focal plane common to the cylindrically curved optical elements of both series, said shielding layer having a plurality of narrow elongated light-transmitting areas formed therein in parallel relation to and in optical alignment with each series of elongated cylindrically curved optical elements, the first series of cylindrically curved optical elements serving to converge and direct light rays when received from a projector at a predetermined projection position in front of said screen through the narrow light-transmitting areas aligned therewith and toward said second series of optical elements, said second series of cylindrically curved optical elements and the reflecting layer thereon serving to reflect and converge light rays so received so as to pass through the plurality of narrow light-transmitting areas aligned therewith and toward an audience area in front of said screen, said light-shielding layer cooperatively functioning with said cylindrically curved optical elements to prevent light from light sources spaced appreciably laterally of said projection position from being reflected by said screen toward said audience area.

4. A front projection screen as defined in claim 3 and wherein the light-transmitting areas aligned with one series of cylindrically curved optical elements thereof has light-diffusing characteristics.

5. A front projection screen as defined in claim 3 and which screen has an appreciable concave curvature in the horizontal direction thereof, and is arranged to have its concave surface facing the audience area and the projector.

6. A front projection screen comprising a supporting member of appreciable width and height and formed of light-transmitting material, said member having a first series and a second series of elongated cylindrically curved substantially parallel contiguously related optical elements formed respectively upon the front and rear surfaces of said member, one of said series of cylindrically curved optical elements extending substantially in the horizontal direction of said screen and the other of said series of cylindrically curved optical elements extending substantially in the vertical direction thereof, a light-reflecting layer disposed upon the outer surfaces of all of the cylindrically curved optical elements at the rear of said member, and a light-shielding layer so interposed between and in generally parallel relation to the front and rear surfaces of said member as to be substantially at a focal plane common to the cylindrically curved optical elements of both series, said shielding layer having a plurality of narrow elongated light-transmitting areas formed therein in parallel relation to and in optical alignment with each series of elongated cylindrically curved optical elements, the first series of cylindrically curved optical elements serving to converge and direct light rays when received from a projector at a predetermined projection position in front of said screen through the narrow light-transmitting areas aligned therewith and toward said second series of optical elements, said second series of cylindrically curved optical elements and the reflecting layer thereon serving to reflect and converge the light rays so received and direct same through the plurality of narrow light-transmitting areas aligned therewith and toward an audience area in front of said screen, said light-shielding layer cooperatively functioning with said cylindrically curved optical elements to prevent light from light sources spaced appreciably laterally of said projection position from being reflected by said screen toward said audience area.

7. A front projection screen as defined in claim 6 and wherein the light-transmitting areas aligned with the vertically disposed series of cylindrically curved optical elements has light-diffusing characteristics.

8. A front projection screen comprising a supporting member of appreciable width and height and formed of light-transmitting material, said member having a first series and a second series of elongated cylindrically curved substantially parallel contiguously related optical elements formed respectively upon the front and rear surface of said member and of such radii of curvature as to have a common focal plane, one of said series of cylindrically curved optical elements extending substantially in the horizontal direction of said screen and the other of said series of cylindrically curved optical elements extending substantially in the vertical direction thereof, a light-reflecting layer disposed upon the outer surfaces of all of the cylindrically curved optical elements at the rear of said member, and a light-shielding layer so interposed between and in generally parallel relation to the front and rear surfaces of said member, said shielding layer being formed of a photosensitive material which has been exposed to light and developed so as to render said layer light-absorbing except for a narrow elongated light-transmitting area in optical alignment with each of the elements of said first and second series of elongated cylindrically curved optical elements, the first series of cylindrically curved optical elements serving to converge and direct light rays when received from a projector at a predetermined projection position in front of said screen through the narrow light-transmitting areas aligned therewith and toward said second series of optical elements, said second series of cylindrically curved optical elements and the reflecting layer thereon serving to reflect and converge the light rays so received so as to pass through the narrow light-transmitting areas aligned therewith and toward an audience area in front of said screen, said light-shielding layer cooperatively functioning with said cylindrically curved optical elements to prevent light from light sources spaced appreciably laterally of said projection positon from being reflected by said screen toward said audience area.

9. A front projection screen as defined in claim 8 and wherein the width of each cylindrically curved optical element with reference to its focal length is such as to direct most of the light rays when emerging from the front surface of the screen toward said audience area and substantially into horizontal and vertical angles of predetermined values.

References Cited in the file of this patent

UNITED STATES PATENTS

| | | |
|---|---|---|
| 1,849,036 | Ernst | Mar. 8, 1932 |
| 1,882,829 | Hall | Oct. 18, 1932 |
| 2,210,806 | Etbauer | Aug. 6, 1940 |
| 2,338,654 | MacNeille | Jan. 4, 1944 |
| 2,351,034 | Gabor | June 13, 1944 |
| 2,358,070 | Holmes et al. | Sept. 12, 1944 |
| 2,381,614 | Moller et al. | Aug. 7, 1945 |
| 2,618,198 | Luboshez | Nov. 18, 1952 |